(12) United States Patent
Chodorow et al.

(10) Patent No.: US 11,660,826 B2
(45) Date of Patent: *May 30, 2023

(54) HYBRID DENTAL TOOL WITH DETACHABLE PICKS

(71) Applicant: Sacks Holdings, Inc., Solana Beach, CA (US)

(72) Inventors: Devin S. Chodorow, Rancho Santa Fe, CA (US); Ingram S. Chodorow, Rancho Santa Fe, CA (US)

(73) Assignee: SACKS HOLDINGS, INC., Solana Beach, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/373,649

(22) Filed: Jul. 12, 2021

(65) Prior Publication Data

US 2022/0032557 A1 Feb. 3, 2022

Related U.S. Application Data

(63) Continuation of application No. 14/922,971, filed on Oct. 26, 2015, now Pat. No. 11,059,237, which is a continuation-in-part of application No. 14/546,901, filed on Nov. 18, 2014, now Pat. No. 9,717,575.

(60) Provisional application No. 62/036,028, filed on Aug. 11, 2014.

(51) Int. Cl.
| | |
|---|---|
| *A61C 15/04* | (2006.01) |
| *B29C 69/00* | (2006.01) |
| *A61C 15/02* | (2006.01) |
| *B29L 31/00* | (2006.01) |

(52) U.S. Cl.
CPC ............ *B29C 69/005* (2013.01); *A61C 15/02* (2013.01); *A61C 15/046* (2013.01); *B29L 2031/00* (2013.01)

(58) Field of Classification Search
CPC ............................... A61C 15/02; A61C 15/046
See application file for complete search history.

(56) References Cited

U.S. PATENT DOCUMENTS

| | | | |
|---|---|---|---|
| 869,175 | A | 10/1907 | Peter et al. |
| 958,335 | A | 5/1910 | Strock |
| 1,417,518 | A | 5/1922 | Henerlau |
| 1,882,204 | A | 10/1932 | Zrna et al. |
| 2,510,194 | A | 6/1950 | Thomas |

(Continued)

OTHER PUBLICATIONS

U.S. Appl. No. 14/546,901, "Final Office Action", dated May 18, 2016, 8 pages.

(Continued)

*Primary Examiner* — Rachel R Steitz
*Assistant Examiner* — Brianne E Kalach
(74) *Attorney, Agent, or Firm* — Kilpatrick Townsend & Stockton LLP (57) ABSTRACT

A hybrid dental tool is disclosed herein. The hybrid dental tool includes a flosser having a flossing head. The flossing head can include a filament stretching between the first arm and a second arm. The flossing head can include a pick receptacle. The hybrid dental tool can further include a pick that has a first end and a second end. The pick can be sized and shaped to fit within the pick receptacle such that the first and second ends are protected. The pick can releasably connect with the flossing head to allow the separation of the pick from the flossing head.

20 Claims, 9 Drawing Sheets

(56) References Cited

U.S. PATENT DOCUMENTS

| | | |
|---|---|---|
| 2,544,276 A | 3/1951 | Ness |
| 3,783,883 A | 1/1974 | Alexander et al. |
| 4,006,750 A | 2/1977 | Chodorow |
| 4,016,892 A | 4/1977 | Chodorow |
| D244,376 S | 5/1977 | Chodorow |
| D244,609 S | 6/1977 | Chodorow |
| D250,214 S | 11/1978 | Chodorow |
| D291,412 S | 8/1987 | Chodorow et al. |
| D295,020 S | 4/1988 | Franchi |
| 4,807,752 A | 2/1989 | Chodorow |
| D301,071 S | 5/1989 | Franchi |
| D323,723 S * | 2/1992 | Chung ............... D28/68 |
| 5,086,792 A | 2/1992 | Chodorow |
| 5,113,880 A | 5/1992 | Narimichi et al. |
| 5,538,023 A | 7/1996 | Oczkowski et al. |
| 5,692,531 A | 12/1997 | Chodorow et al. |
| D401,701 S | 11/1998 | Chodorow |
| 5,829,458 A * | 11/1998 | Chodorow ............ A61C 15/02 |
| | | 132/328 |
| D408,589 S | 4/1999 | Chodorow |
| D410,115 S | 5/1999 | Chodorow |
| 5,931,171 A | 8/1999 | Landis et al. |
| 5,975,296 A | 11/1999 | Dolan et al. |
| D424,748 S | 5/2000 | Dolan |
| 6,065,479 A | 5/2000 | Chodorow et al. |
| 6,085,760 A | 7/2000 | Chodorow et al. |
| 6,220,256 B1 | 4/2001 | Dolan et al. |
| D443,113 S | 5/2001 | Chodorow |
| D456,566 S | 4/2002 | Chodorow |
| 6,544,457 B1 | 4/2003 | Rieser |
| D489,490 S | 5/2004 | Chodorow |
| 6,752,158 B1 | 6/2004 | Gwen |
| D493,575 S | 7/2004 | Gwen |
| D533,965 S | 12/2006 | Chodorow et al. |
| 7,234,475 B2 | 6/2007 | Ding et al. |
| 7,281,289 B1 | 10/2007 | Mirza et al. |
| 7,370,658 B2 | 5/2008 | Chodorow et al. |
| D578,254 S | 10/2008 | Grendol |
| 7,487,785 B2 | 2/2009 | Dougan et al. |
| D606,706 S | 12/2009 | Chodorow et al. |
| D607,152 S | 12/2009 | Chodorow et al. |
| D607,606 S | 1/2010 | Chodorow et al. |
| D612,104 S | 3/2010 | Chodorow et al. |
| D637,762 S | 5/2011 | Nanda |
| 8,079,374 B2 | 12/2011 | Chodorow et al. |
| D662,671 S | 6/2012 | Griffin et al. |
| 8,375,961 B2 | 2/2013 | Prokopchuk et al. |
| D681,879 S | 5/2013 | Stebila et al. |
| 8,522,798 B2 | 9/2013 | Kollar et al. |
| D750,326 S | 2/2016 | Lannie |
| D765,915 S | 9/2016 | Lannie |
| D777,377 S | 1/2017 | Dudley et al. |
| 9,554,663 B2 | 1/2017 | Truog et al. |
| 9,717,575 B2 | 8/2017 | Chodorow et al. |
| 11,059,237 B2 | 7/2021 | Chodorow et al. |
| 2002/0020427 A1 | 2/2002 | Lin et al. |
| 2005/0048439 A1 | 3/2005 | Gwen et al. |
| 2008/0314406 A1 | 12/2008 | Barrie |
| 2011/0132392 A1 | 6/2011 | Crisp et al. |
| 2012/0080049 A1 | 4/2012 | Liu |
| 2012/0111348 A1 | 5/2012 | Prokopchuk et al. |
| 2012/0234350 A1 | 9/2012 | Mowell et al. |
| 2012/0285478 A1 | 11/2012 | Griffin et al. |
| 2014/0326274 A1 | 11/2014 | Kollar et al. |
| 2016/0038263 A1 | 2/2016 | Chodorow et al. |
| 2016/0113744 A1 | 4/2016 | Chodorow |

OTHER PUBLICATIONS

U.S. Appl. No. 14/546,901, "Non-Final Office Action", dated Oct. 20, 2015, 9 pages.

U.S. Appl. No. 14/546,901, "Notice of Allowance", dated Apr. 17, 2017, 5 pages.

U.S. Appl. No. 14/546,901, "Notice of Allowance", dated Dec. 2, 2016, 9 pages.

U.S. Appl. No. 14/922,971, "Advisory Action", dated Mar. 26, 2019, 3 pages.

U.S. Appl. No. 14/922,971, "Final Office Action", dated Nov. 15, 2018, 10 pages.

U.S. Appl. No. 14/922,971, "Final Office Action", dated Aug. 3, 2020, 8 pages.

U.S. Appl. No. 14/922,971, "First Action Interview Office Action Summary", dated May 18, 2018, 6 pages.

U.S. Appl. No. 14/922,971, "First Action Interview Pilot Program Pre-Interview Communication", dated Apr. 4, 2018, 5 pages.

U.S. Appl. No. 14/922,971, "Non-Final Office Action", dated Feb. 24, 2020, 8 pages.

U.S. Appl. No. 14/922,971, "Notice of Allowance", dated Mar. 17, 2021, 11 pages.

\* cited by examiner

FIG. 16

HYBRID DENTAL TOOL WITH DETACHABLE PICKS

CROSS-REFERENCES TO RELATED APPLICATIONS

This application is a continuation of U.S. application Ser. No. 14/922,971, entitled "HYBRID DENTAL TOOL WITH DETACHABLE PICKS," and filed on Oct. 26, 2015, which is a continuation-in-part of U.S. application Ser. No. 14/546,901, entitled "HYBRID DENTAL TOOL WITH DETACHABLE PICKS," and filed on Nov. 18, 2014, which claims the benefit of U.S. Provisional Application No. 62/036,028 entitled "HYBRID DENTAL TOOL WITH DETACHABLE PICKS," and filed on Aug. 11, 2014, the entirety of which is hereby incorporated by reference herein.

BACKGROUND

The present disclosure relates, generally, to dental devices, and more particularly to dental hygiene devices.

While dental hygiene has long been important in American and other cultures for maintaining a desirable physical appearance, recent discoveries have increased the urgency with which dental hygiene is maintained. These recent discoveries have linked oral bacteria to other, more serious disease such as, for example, heart disease. In light of the increased importance of dental hygiene, new devices are desired to improve dental hygiene.

BRIEF SUMMARY

One aspect of the present disclosure relates to a hybrid dental device. The hybrid dental device includes a flossing head having a first arm extending in a first direction, a second arm extending in the first direction, and a third arm extending in the first direction. The flossing head can include a first filament extending from the first arm to the second arm, and a second filament extending form the second arm to the third arm. In some embodiments, the first and second filament are separately connected to the second arm.

In some embodiments, the first, second, and third arms extend in the first direction in that a directional component of each of the first, second, and third arms extends in the same direction. In some embodiments, the first filament can be a first lubricious fiber and the second filament can be a second lubricious fiber. In some embodiments, the first lubricious fiber and the second lubricious fiber are the same material, and in some embodiments, the first lubricious fiber and the second lubricious fiber are different materials.

In some embodiments, the flossing head further includes a link arm extending from the first arm to the second arm and extending from the second arm to the third arm. IN some embodiments, a first distance from a first point of extension of the first filament from the first arm to the link arm is the same as a second distance from a second point of extension of the second filament from the third arm to the link arm. In some embodiments, the first filament and the second filament are parallel.

In some embodiments, the link arm includes a first portion extending between the first arm and the second arm, a second portion extending between the second arm and the third arm, and a third portion located between the first portion and the second portion. In some embodiments, the first portion and the second portion are located in a common, first plane, and in some embodiments, the third portion is located in a second plane. In some embodiments, a shortest third distance between a line along a longitudinal axis of one of the first and second filaments and the first portion and a shortest fourth distance between the line along the longitudinal axis of one of the first and second filaments and the second portion are shorter than a shortest fifth distance between the line along the longitudinal axis of one of the first and second filaments and the third portion.

One aspect of the present disclosure relates to a method of manufacturing a hybrid dental device. The method includes forming a flossing head around a single filament. In some embodiments, the flossing head includes a first arm extending in a first direction, a second arm extending in the first direction, and a third arm extending in the first direction. In some embodiments, the single filament extends from the first arm to the second arm, and from the second arm to the third arm. The method can include severing the single filament to form an independent first filament extending form the first arm to the second arm and an independent second filament extending from the second arm to the third arm.

In some embodiments, the single filament is severed by a heated cutting implement. In some embodiments, the first, second, and third arms extend in the first direction in that a directional component of each of the first, second, and third arms extends in the same direction. In some embodiments, the second arm includes a first portion connecting to the first filament and a second portion connecting to the second filament. In some embodiments, the first and second portions are unconnected along the entirety of their length. In some embodiments, the single filament comprises a lubricious fiber.

In some embodiments, the flossing head further includes a link arm extending from the first arm to the second arm and extending from the second arm to the third arm. In some embodiments, a first distance from a first point of extension of the first filament from the first arm to the link arm is the same as a second distance from a second point of extension of the second filament from the third arm to the link arm.

In some embodiments, the link arm includes a first portion extending between the first arm and the second arm, a second portion extending between the second arm and the third arm, and a third portion located between the first portion and the second portion. In some embodiments, a shortest third distance between a line along a longitudinal axis of one of the first and second filaments and the first portion and a shortest fourth distance between the line along the longitudinal axis of one of the first and second filaments and the second portion are shorter than a shortest fifth distance between the line along the longitudinal axis of one of the first and second filaments and the third portion.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Where the reference label is used in the specification, the description is applicable to any one of the similar components having the same reference label.

DETAILED DESCRIPTION OF THE INVENTION

In some embodiments, the present disclosure relates to a hybrid dental device and/or hybrid dental tool. In some embodiments, the hybrid dental tool can integrate multiple oral or personal care devices into a single device. In some embodiments, the hybrid dental tool can include a flosser and one or several picks. In some embodiments, the one or several picks can be integrated into the flosser, and/or retained by the flosser. In one embodiment, the one or several picks can include a first end and a second end. In some embodiments, one or both of the first and second ends of the pick can be a dental hygiene tool, such as a tooth pick, that can, in some embodiments, be sized and shaped to allow insertion into the interproximal space between human teeth. In one particular embodiment, the one or several picks can be received in a pick receptacle. In some embodiments, the pick receptacle can be sized and shaped such that when the one or several picks are in the pick receptacle, the first and second ends of the pick are protected in that they are contained within the pick receptacle so as to be snag free.

For the purposes of explanation, the ensuing details are set forth in order to provide a thorough understanding of various embodiments. It will be apparent, however, to one skilled in the art that various embodiments may be practiced without some of these specific details. For example, various features may be shown as components of some specific embodiments. In other instances, previously known features may be shown without unnecessary detail in order to avoid obscuring the inventive features of the described embodiments.

Embodiments provided herein are examples only, and are not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed embodiments.

Figure 1:
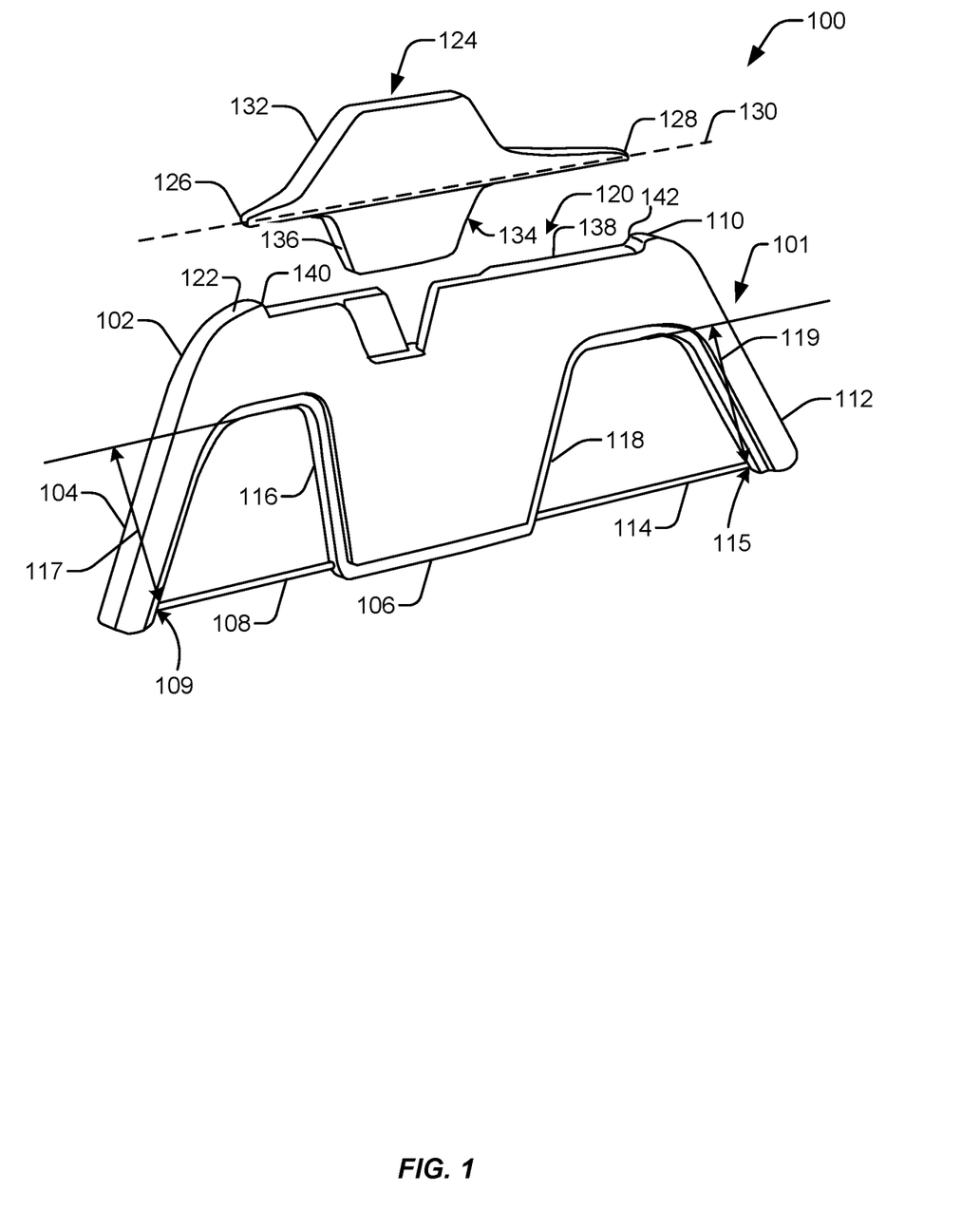
FIG. 1 is a perspective view of one embodiment of a disassembled hybrid dental tool.

With reference now to FIG. 1, a perspective view of one embodiment of hybrid dental tool 100 is shown. The hybrid dental tool 100 can comprise a variety of shapes and sizes. In some embodiments, the hybrid dental tool 100 can be sized so as to be easily held in a hand and to be used within a mouth. The hybrid dental tool 100 can be made from a variety materials. In some embodiments, the hybrid dental tool 100 can be made from one or several plastics, metals, composites, polymers, or the like. In some embodiments, the materials for the hybrid dental tool 100 are selected based on desired properties of a hybrid dental tool and/or of the specific portion of the hybrid dental tool.

The hybrid dental tool 100 can include a flosser 101. The flosser 101 can include a flossing head 102, also referred to herein as a flossing portion. The flossing head 102 can include features configured to allow use of the hybrid dental tool 100 in flossing the teeth. The flossing head 102 can comprise a variety of shapes and sizes, and in some embodiments, can be sized and shaped so as to allow a user to access all of the teeth in the user's mouth, and particularly the teeth located in the rear of the mouth.

The flossing head 102 can include a first arm 104, also referred to herein as a leading arm, and a second arm 106, also referred to herein as a trailing arm. In some embodiments, the first arm 104 can be located at the front of the flossing head 102 and/or of the flosser 101 and the trailing arm 106 can be relatively more centrally located in the flosser 101. In some embodiments, the leading arm 104 and the trailing arm 106 are parallel, and in some embodiments, the leading arm 104 and the trailing arm 106 are nonparallel. In some embodiments, the first and second arms 104, 106 can extend in the same direction. In some embodiments, the first and second arms 104, 106 extend in the same direction if they are parallel, and in some embodiments, the first and second arms 104, 106 extend in the same direction if a component of the extension of the first and second arms 104, 106 is parallel.

In some embodiments, the leading arm 104 and the trailing arm 106 both extend from a link arm 110 and can be connected by a first filament 108, which first filament 108 can extend from the first arm 104 at a first point of extension 109. In some embodiments, the first point of extension 109 can be separated from the link arm 110 by a first distance 117. In some embodiments, this first distance 117 can be the shortest distance between the first extension point 109 and the link arm 110. This connection of the leading arm 104, the trailing arm 106, and the link arm 110 can create a U-shaped portion of the flossing head 102. In some embodiments, the connection of the leading arm 104, the trailing arm 106, and link arm 110 can create other shapes such as, for example, a C-shape, a trapezoidal shape, or the like.

In some embodiments, the first filament 108 can be a thin single fiber and/or group of fibers that is/are sized, shaped, and configured for insertion between the patient's teeth into, for example, the interproximal space. This first filament 108 can comprise any lubricious fiber sufficiently strong and thin to be used for dental hygiene. In some embodiments, the first filament 108 can comprise any dental floss including, for example, a waxed fiber such as a nylon or cotton fiber, a polytetrafluoroethylene (PTFE) fiber, an ultra-high-molecular-weight polyethylene (UHMPE) fiber, or any other fiber. In some embodiments, the first filament 108 can comprise dental floss.

In some embodiments, the flosser 101 can comprise a single flosser, and in some embodiments, the flosser 101 can comprise a multiple flosser. In the embodiment, depicted in FIG. 1, the flosser 101 is a double flosser, also referred to herein as a twin flosser. In such a double flosser configuration, the flosser 101 includes a third arm 112 and a second filament 114 that extends between the third arm 112 and the second arm 106. The second filament 114 can extend from the third arm 112 at a second point of extension 115. In some embodiments, the second point of extension 115 can be separated from the link arm 110 by a second distance 119. In some embodiments, this second distance 119 can be the shortest distance between the second extension point 115 and the link arm 110. In some embodiments, the first distance 117 can be the same as the second distance 119, and in some embodiments, the first and second distances 117, 119 can be different.

In some embodiments, the second arm 106 can include a first portion 116 to which the first filament 108 connects, and a second portion 118 to which the second filament 114 connects. In some embodiments, the first and second portions 116, 118 of the second arm 106 can extend in the same direction away from the link arm 110, and in some embodiments, the first and second portions 116, 118 of the second arm 106 can extend in different directions away from the link arm 110.

In some embodiments, the second filament 114 can be a thin single fiber and/or group of fibers that is/are sized, shaped, and configured for insertion between the patient's teeth into, for example, the interproximal space. This second filament 114 can comprise any lubricious fiber sufficiently strong and thin to be used for dental hygiene. In some embodiments, second filament 114 can comprise any dental floss including, for example, a waxed fiber such as a nylon or cotton fiber, a polytetrafluoroethylene (PTFE) fiber, or any other fiber. In some embodiments, the second filament 114 can comprise dental floss.

In some embodiments, the first filament 108 and the second filament 114 can comprise a single filament that extends from the first arm 104 to the third arm 112, and in some embodiments, the first filament 108 can be separate from the second filament 114. In some embodiments, one or both of the first and second filaments 108, 114 can comprise a plurality of filaments such as, for example, two, three, four, five and/or any other or intermediate number of filaments. In some embodiments, the filaments of the plurality of filaments can be made from the same material, and in some embodiments, the filaments of the plurality of filaments can be made from different materials.

In some embodiments in which one or both of the first and second filaments 108, 114 comprises a plurality of filaments, the filaments of the plurality of filaments can be positioned adjacent to each other such that the plurality of filaments can simultaneously clean a single interproximal space. In one specific embodiment, both the first and second filaments 108, 114 can comprise a plurality of filaments, the first filament 108 can comprise a plurality of filaments, the second filament 114 can comprise a plurality of filaments, or neither the first nor second filaments 108, 114 can comprise a plurality of filaments.

As seen in FIG. 1, the flosser 101 includes a pick receptacle 120 along the top 122 of the link arm 110 between the first arm 104 and the third arm 112. The pick receptacle 120 can be configured to receive and/or retain a pick 124.

The pick 124 can comprise a variety of shapes and sizes, and can be made from a variety of materials. In some embodiments, the pick 124 can be made from the same material as the flosser 101, and in some embodiments, the pick 124 can be made from a different material than the flosser 101. In some embodiments, for example, the pick 124 can be made from the same material, including, for example, the same polymer, having the same material properties as the flosser 101, and in some embodiments, the pick 124 can be made from a different material, including, for example a different polymer having different material properties than the flosser 101.

The pick 124 can comprise a first end 126, a second end 128, and a longitudinal axis 130 extending therebetween. In some embodiments, one or both of the first and second ends 126, 128 of the pick 124 can comprise a tool, including a dental hygiene tool such as, for example, a tooth pick, tongue scraper/cleaner, a scalar, a pick, a brush, a mirror, or the like. In some embodiments, one or both of the first and second ends 126, 128 of the pick 124 can be configured for cleaning between a human's teeth, and in some embodiments, can be sized and shaped to allow insertion into the interproximal space between human teeth.

The pick 124 can include a grip portion 132. The grip portion 132 can comprise a variety of shapes, sizes, and features. In some embodiments, the grip portion 132 can be sized and shaped to facilitate the gripping and manipulation of the pick 124. In some embodiments, the grip portion 132 can be located at a midpoint of the pick 124 such that the distance between the grip portion 132 and both the first and second ends 126, 128 is the same, and in some embodiments, the grip portion 132 can be located at a position other than the midpoint of the pick 124 such that the distance between the grip portion and the first and second ends 126, 128 is unequal. In some embodiments, the grip portion 132 can be located at one or both of the first and second ends 126, 128 of the pick 124.

In some embodiments, the pick 124 can include one or several mating features 134. The one or several mating features 134 can be configured to matingly engage with one or several features of the flosser 101. In the embodiment of the pick 124 depicted in FIG. 1, the one or several mating features 134 comprise insert 136.

Returning again to the pick receptacle 120 of the flosser 101, in some embodiments, the pick receptacle 120 can be sized to receive the pick 124, and specifically can have one or several dimensions larger than one or several corresponding dimensions of the pick 124 so as to thereby allow portions of the pick 124 to be received within the pick receptacle 120. In some embodiments, the pick receptacle 120 can be a depression in the flosser head 102, and specifically in the link arm 110 of the flosser head 102, and in some embodiments, the pick receptacle 120 can be, for example, located in a handle of the flosser 101.

In some embodiments, the pick receptacle 120 can include an end receptacle 138 that is bounded by a first end receptacle wall 140 and a second end receptacle wall 142. In some embodiments, the end receptacle 138 can be sized and shaped to receive at least one or both of the first and second ends 126, 128 of the pick 124, and can be particularly sized and shaped such that when the first and second ends 126, 128 are received within the end receptacle 138, the first and second ends 126, 128 are protected in that they are not exposed to snags. In some embodiments, the protected state of the first and second ends 126, 128 includes the receiving of the first and second ends 126, 128 such that all or portions of the first and second ends 126, 128 do not extend outside of the volume of the end receptacle 138 and/or of the pick receptacle 120.

Figure 2:
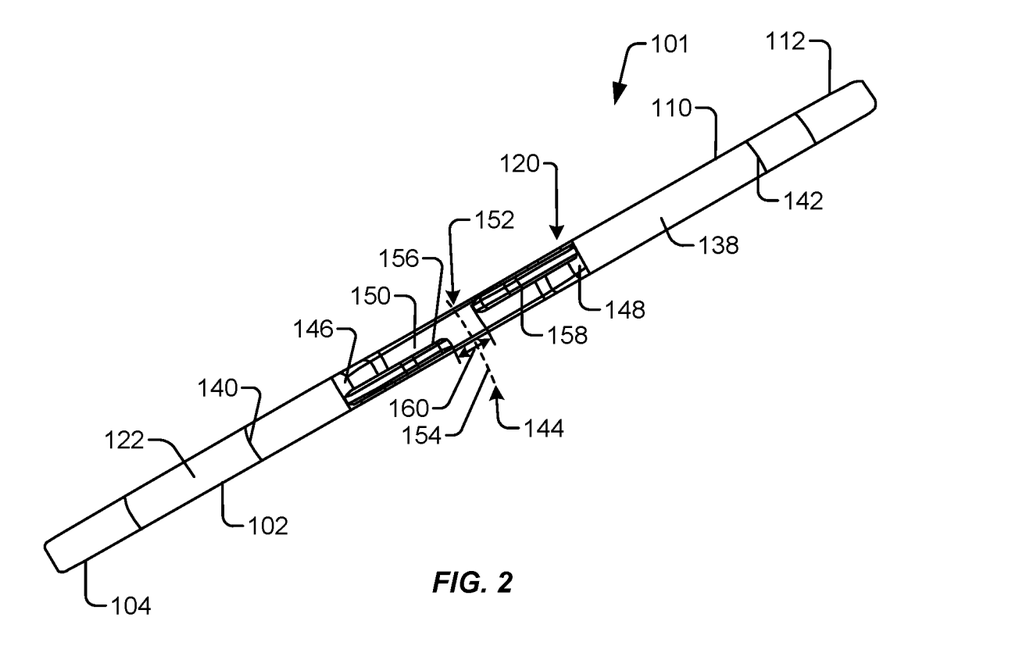
FIG. 2 is a top view of one embodiment of a flosser that is part of a hybrid dental tool.

With reference now to FIG. 2, a top view of one embodiment of flosser 101 is shown. The flosser 101 includes the flossing head 102 including the first arm 104 and the third arm 112 that are connected by the link arm 110. At the top 122 of the link arm 110 is the pick receptacle 120 that includes the end receptacle 138 defined by the first end receptacle wall 140 and the second end receptacle wall 142.

The pick receptacle 120 includes connection features 144, also referred to herein as connecting features 144 and/or capture features 144 that are configured to matingly engage with the mating features 134 of the pick 124 to releasably secure the pick 124 within the pick receptacle 120. In some embodiments, the mating engagement of the mating features 134 and the connecting features 144 can allow the repeatable securement of the pick 124 within the pick receptacle 120, and in some embodiments, the mating engagement of the mating features 134 and the connecting features 144 may not allow the repeatable securement of the pick 124 within the pick receptacle 120.

In the embodiment of FIG. 2, the connecting features comprise a first connection wall 146, also referred to herein as the first wall, a second connection wall 148, also referred to herein as the second wall, and a connection bottom 150 connecting the first and second walls 146, 148. In some embodiments, a plane can be located between, and defined by the first and second walls 146, 148. In the embodiment of FIG. 2, a midline plane 154 is located midway between the first and second walls 146, 148.

In the embodiment seen in FIG. 2, the first and second walls 146, 148 extend from proximate the top 122 of the flossing head 102 towards the first and second filaments 108, 114, and in connection with the connection bottom 150, create a connection receptacle 152. The connection receptacle 152 can comprise a variety of shapes and sizes. In some embodiments, the connection receptacle 152 can be sized to receive the mating features 134 of the pick 124, and specifically to receive the insert 136 of the pick 124.

In the embodiment of FIG. 2, a first tab 156 extends from the first wall 146 and towards the midline plane 154, and a second tab 158 extends from the second wall 148 and towards the midline place 154. In some embodiments, and additionally or alternatively, both the first and second tabs 156, 158 can extend from the connection bottom 150 towards the top 122 of the flossing head 102. These first and second tabs 156, 158 can be configured to matingly engage with the insert 136 of the pick 124 to releasably capture the pick 124 within the pick receptacle 120.

In some embodiments, the first tab 156 and the second tab 158 can extend in the same plane, and in some embodiments, and as depicted in FIG. 2, the first tab 156 and the second tab 158 can extend in different planes. In some embodiments, the first and second tabs 156, 158 can extend through a common plane that is parallel with the midline plane 144 or that is the midline plane 144. In the embodiment of FIG. 2, however, the first and second tabs 156, 158 do not extend through a common plane that is parallel with the midline plane 144 or that is the midline plane 144. Rather, in some embodiments, the first and second tabs 156, 158 can be separated by a space 160 that can be any desired shape and/or size. In some embodiments, this space 160 can facilitate the mating engagement of the first and second tabs 156, 158 with the insert 136.

Figure 2A:
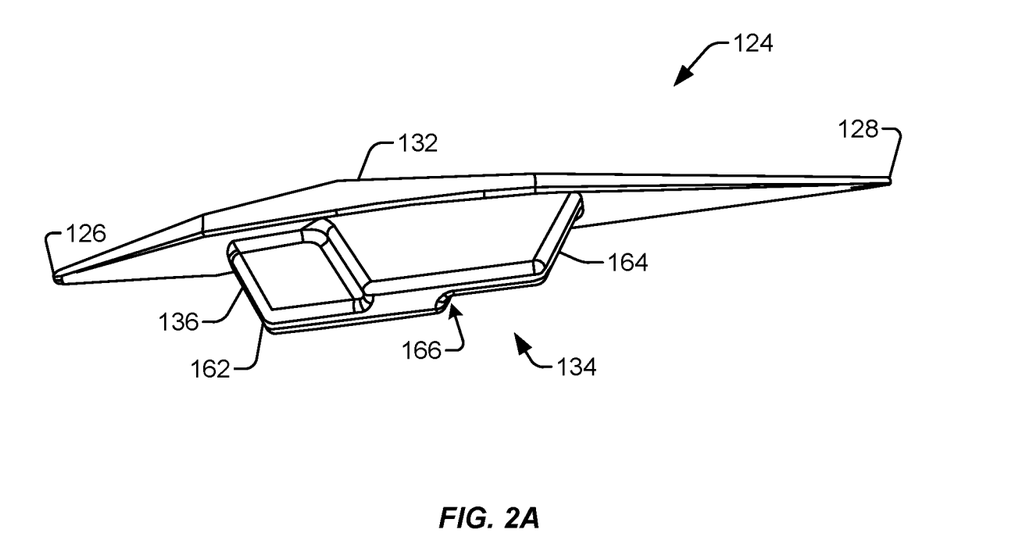
FIG. 2A is a perspective view of one embodiment of a pick that is a part of a hybrid dental tool.

With reference now to FIG. 2A, a perspective view of one embodiment of the pick 124 is shown. The pick 124 includes a first end 126, a second end 128, and a grip portion 132. The pick 124 additionally includes the mating feature 134, and specifically, the insert 136. The insert 136 is a stepped insert having a first planar portion 162 proximate to the first end 126, a second planar portion 164 proximate to the second end 128, and a step 166 connecting the first and second planar portions 162, 164. In some embodiments, the first and second planar portions 162, 164 can be sized, shaped, and/or positioned to engage with the first and second tabs 156, 158. Similarly, in some embodiments, the step 166 can be sized, shaped, and/or positioned to fit within the space 160.

Figure 3:
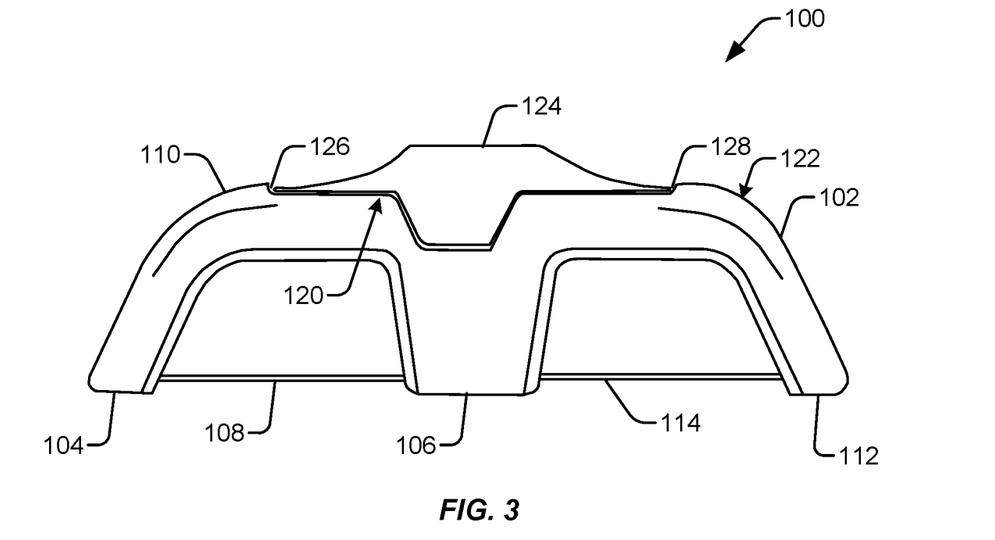
FIG. 3 is a front view of one embodiment of an assembled hybrid dental tool.

With reference now to FIG. 3, a front view of one embodiment of the hybrid dental tool 100 is shown. As seen, the hybrid dental tool 100 includes the flossing head 102 having the first arm 104 connected to the second arm 106 by the first filament 108 and the link arm 110, and the second arm 106 connected to the third arm 112 by the second filament 114 and the link arm 110. At the top 122 of the flossing head 102 is the pick receptacle 120. As seen in FIG. 3, the pick receptacle 120 receives portions of the pick 124, and specifically receives the first and second ends 126, 128 of the pick 124 such that the first and second ends 126, 128 are below the top 122 of the flossing head 102, and are thus within the volume of the pick receptacle 120.

Figure 4:
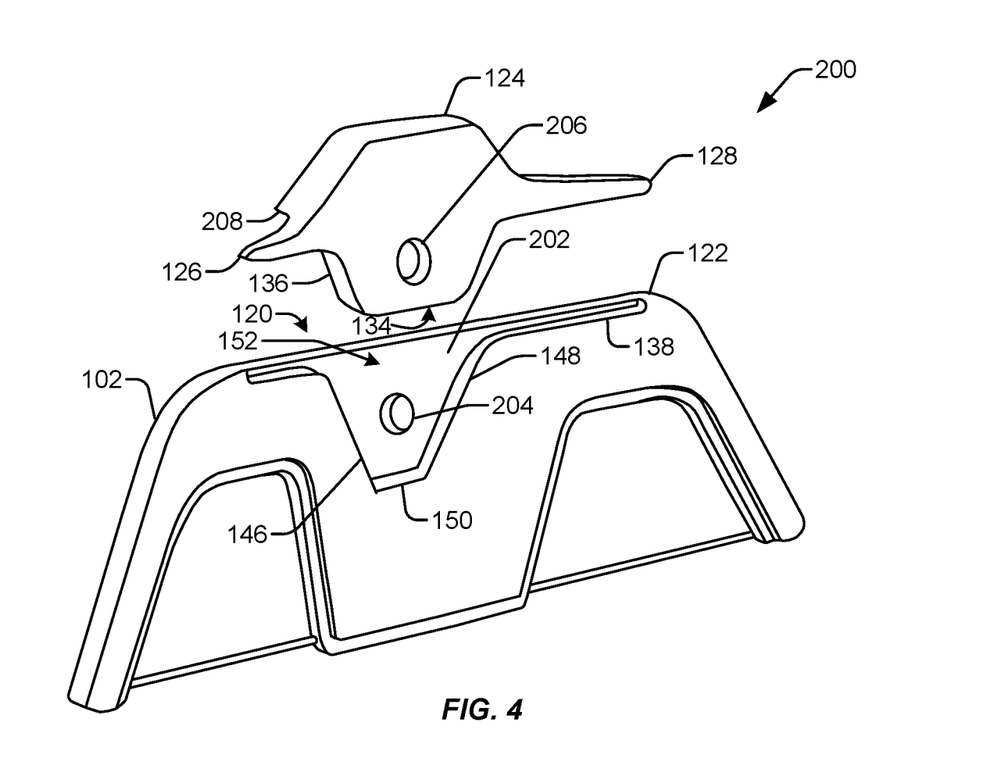
FIG. 4 is a perspective view of an embodiment of a hybrid dental tool that retains a pick with a retention insert.

With reference now to FIG. 4, a perspective view of an embodiment of a hybrid dental tool 200 is shown. This hybrid dental tool 200 includes the same features as the hybrid dental tool 100 with the exception of the pick receptacle 120, the connection features 144, and the mating features 134. The hybrid dental tool 200 includes the flossing head 102 having a top 122 and a pick receptacle 120. The pick receptacle 120 includes an end receptacle 138 that receives the first and second ends 126, 128 of the pick 124. The pick receptacle 120 additionally includes the first and second walls 146, 148, and the connection bottom 150, that together define the connection receptacle 152.

In contrast to the embodiment of FIG. 1, the hybrid dental tool 200 includes a back wall 202 that defines a boundary of the connection receptacle 152 that is perpendicular to one or both of the midline plane (not shown in FIG. 4) and the top 122. The back wall 202 can, in some embodiments, include a retention insert 204 that can be received by a mating receptacle 206 of the pick 124 to retain the pick 124 in the pick receptacle 120. The retention insert 204, and the mating receptacle 206, can comprise a variety of shapes and sizes. In one embodiment, the retention insert 204 can comprise a cylindrical protrusion, and the mating receptacle 206 can comprise a hole in the insert 136 of the pick 124.

As further seen in FIG. 4, the pick 124 includes an abutment face 208 that can be configured to abut with the top 122 of the back wall 202. In some embodiments, this abutment face 208 can stabilize the pick 124 when the pick 124 is in the pick receptacle 120.

Figure 5:
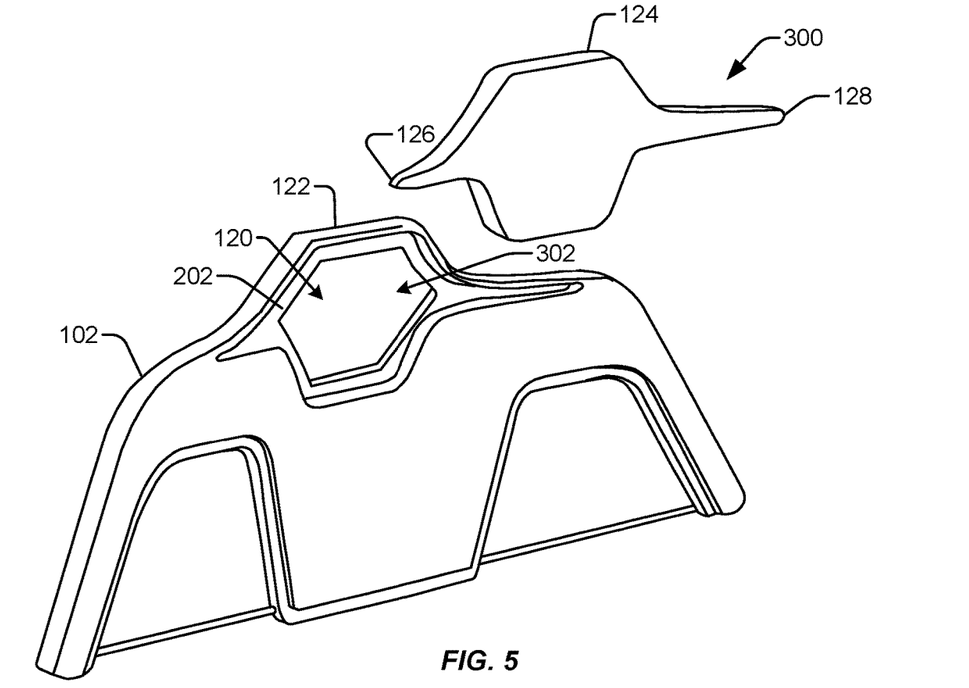
FIG. 5 is a perspective view of an embodiment of a hybrid dental tool that completely retains a pick within a pick receptacle.

With reference now to FIG. 5, a perspective view of an embodiment of a hybrid dental tool 300 is shown. This hybrid dental tool 300 includes the same features as the hybrid dental tool 100 with the exception of the pick receptacle 120. The hybrid dental tool 300 includes the flossing head 102 having a top 122 and a pick receptacle 120. The pick receptacle 120 shown in FIG. 5 is sized and shaped to receive the entire pick 124, and includes a back wall 202 that defines an access opening 302. In this embodiment, the pick 124 fits completely within the pick receptacle 120, and is removed from the pick receptacle 120 by the application of a force to the pick 124 through the access opening 302.

Figure 6:
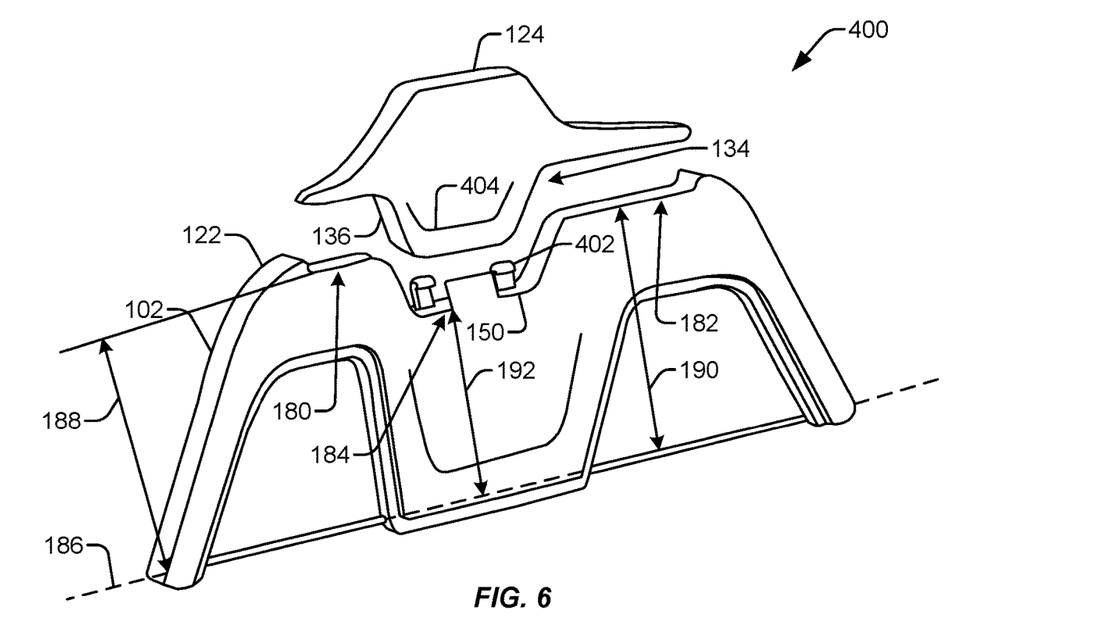
FIG. 6 is a perspective view of an embodiment of a hybrid dental tool that retains a pick with latches.

With reference now to FIG. 6, a perspective view of an embodiment of a hybrid dental tool 400 is shown. This hybrid dental tool 400 includes the same features as the hybrid dental tool 100 with the exception of the connection features 144 and the mating features 134. The hybrid dental tool 400 includes the flossing head 102 having a top 122 and a pick receptacle 120. The pick receptacle 120 shown in FIG. 6 includes a plurality of latches 402, which latches 402 can be, for example, compliant. In the embodiment of FIG. 6, the latches 402 are located on the bottom 150 of the pick receptacle 120, but in some embodiments, the latches 402 can be located on any features and/or component of the pick receptacle 120. The latches 402 of the flossing head 102 are configured to engage with the mating features 134 of the pick 124, and specifically to engage with a lip 404 located along all or portions of the insert 136.

As further seen in FIG. 6, the link arm 110 can, in some embodiments, include a plurality of portions 180, 182, 184 located at or along the top 122 of the link arm 110. In some embodiments, these can include, for example, a first portion 180 that can be relatively more proximate to the first arm 104 than the third arm 112, a second portion 182 relatively more proximate to the third arm 112 than to the first arm 104, and a third portion 184 located between the first and second portions 180, 182. In some embodiments, the first portion 180 extends between the first arm 104 and the second arm 106, and the second portion 182 extends from the second arm 106 to the third arm 112.

In some embodiments, two or more of the first portion 180; the second portion 182; and the third portion 184, can be located in the same plane or in different planes. In one embodiment, for example, the first and second portions 180, 182 can be located in a first plane that is defined by the points of the first and second portions 180, 182 equidistant from a line along a longitudinal axis 186 of one or both of the first and second filaments 108, 114. In some embodiments, the third portion 184 can be located in a second plane defined by points of the third portion located equidistant from the line along the longitudinal axis 186 of one or both of the first and second filaments 108, 114.

In some embodiments, each of the first, second, and third portions 180, 182, 184 can be positioned at a shortest distances from the line along the longitudinal axis 186 of one of the first and second filaments 108, 114. In one embodiment, the first portion 180 can be located at a shortest, third distance 188 from the line along the longitudinal axis 186 of one of the first and second filaments 108, 114, the second portion 182 can be located at a shortest, fourth distance 190 from the line along the longitudinal axis 186 of the one of the first and second filaments 108, 114, and the third portion 184 can be located at a shortest, fifth distance 192 from the line along the longitudinal axis 186 of the one of the first and second filaments 108, 114. These distances 188, 190, 192 can, in some embodiments, be the same, and can, in some embodiments, be different. In some embodiments, for example, the firth distance 192 can be shorter than one or both of the third and fourth distances 188, 190, which third and fourth distances 188, 190 can be equal or unequal.

Figure 7:
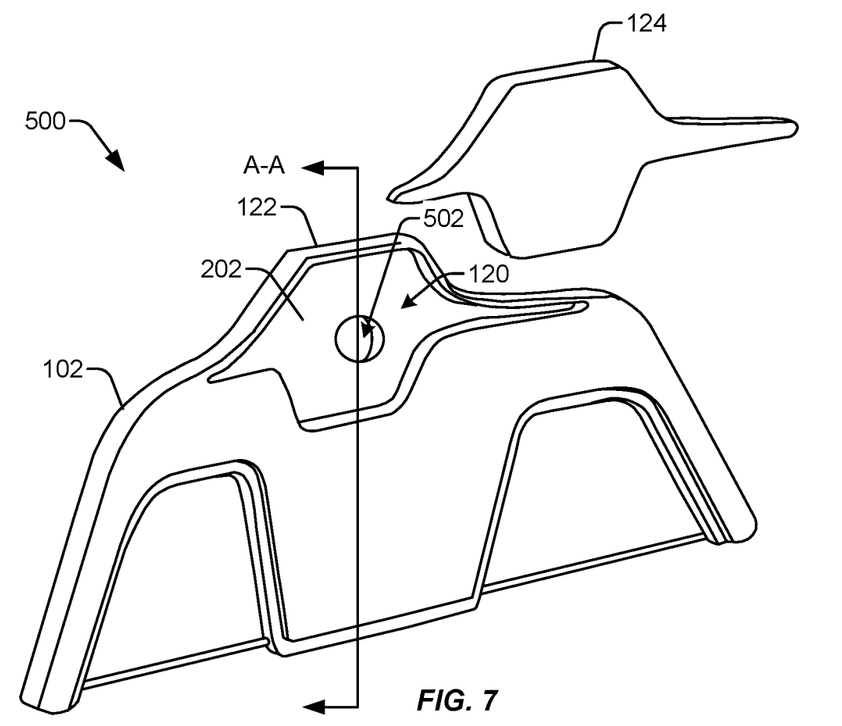
FIG. 7 is a perspective view of an embodiment of a hybrid dental tool that retains a pick with a securement insert.

With reference now to FIG. 7, a perspective view of an embodiment of a hybrid dental tool 500 is shown. This hybrid dental tool 500 includes the same features as the hybrid dental tool 100 with the exception of the connection features 144 and the mating features 134. The hybrid dental tool 500 includes the flossing head 102 having a top 122 and a pick receptacle 120. The pick receptacle 120 shown in FIG. 7 is sized and shaped to receive the entire pick 124, and includes a back wall 202 that defines an opening 502.

Figure 8:
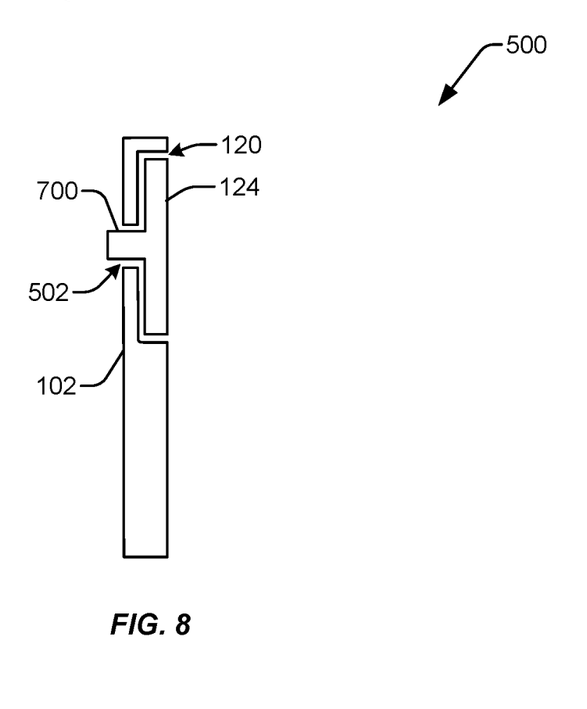
FIG. 8 is a section view of the embodiment of the hybrid dental tool of FIG. 7.

With reference now to FIG. 8, a section view of the hybrid dental device 500 is shown, which section is taken along plane A-A shown in FIG. 7. As seen in FIG. 8, the pick 124, which includes a securement insert 700, fits within the pick receptacle 120 and the securement insert 700 extends through opening 502 to thereby secure the pick within the pick receptacle 120 and to allow the separation of the pick 124 from the flossing head 102.

Figure 9:
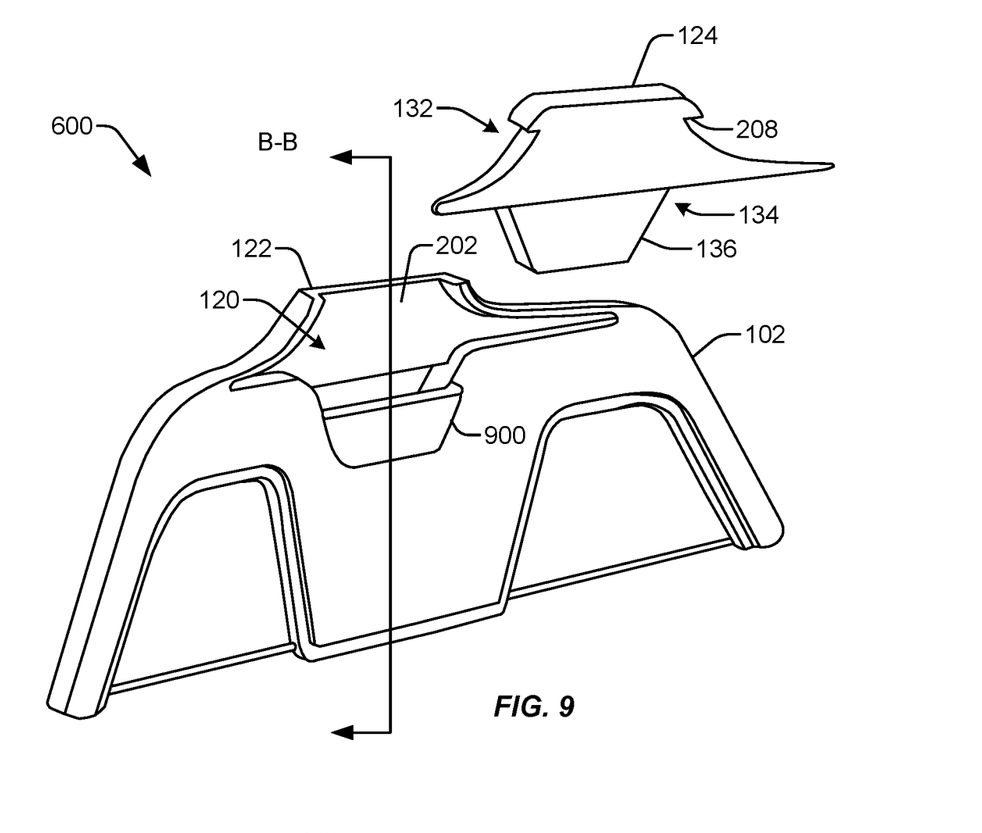
FIG. 9 is a perspective view of an embodiment of a hybrid dental tool that retains a pick with a front wall and a back wall.

With reference now to FIG. 9, a perspective view of an embodiment of a hybrid dental tool 600 is shown. This hybrid dental tool 600 includes the flossing head 102 having a top 122 and a pick receptacle 120. The pick receptacle 120 shown in FIG. 7 is sized and shaped to receive a portion of the pick 124, and includes a back wall 202 and front wall 900. The pick 124 shown in FIG. 9 includes the grip portion 132, the insert 136, and the abutment face 208 that is positioned on the pick 124 to abut top 122 of the flossing head 102 when the pick 124 is received within the pick receptacle 120.

Figures 10, 11:
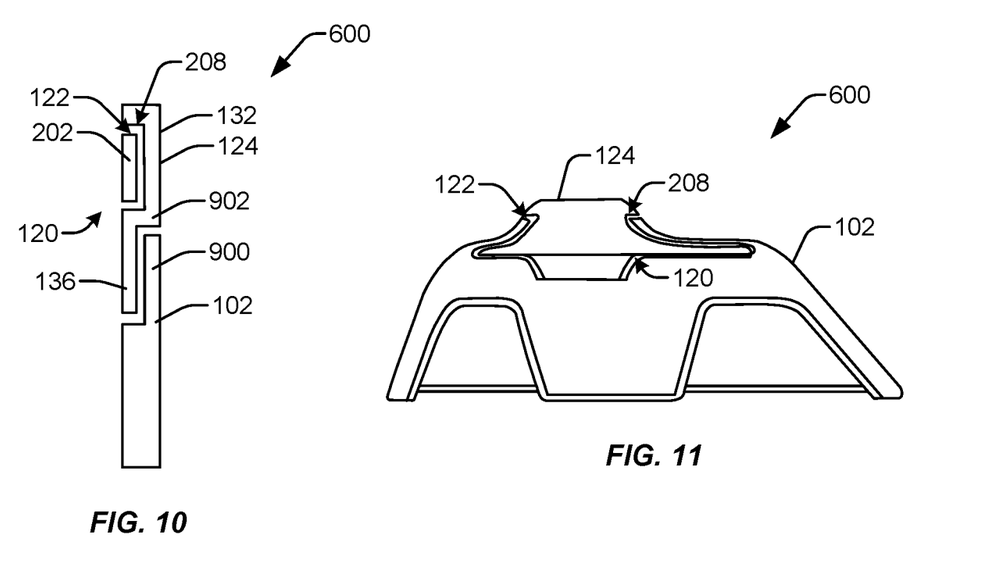
FIG. 10 is a section view of the embodiment of the hybrid dental tool of FIG. 9.
FIG. 11 is a front view of the embodiment of the hybrid dental tool of FIG. 9.

With reference now to FIG. 10, a section view of the hybrid dental device 600 is shown, which section is taken along plane B-B shown in FIG. 9. As seen in FIG. 10, the pick 124, includes a step 902. Because of the step 902, the pick 124 fits within the pick receptacle 120 with the grip portion 132 adjacent to the back wall 202 and the insert 136 adjacent to the front wall 900. As further seen in FIG. 10, when the pick 124 is in the pick receptacle 120, the abutment surface 208 abuts the top 122 of the flossing head 102. This is further seen in FIG. 11.

Figure 12:
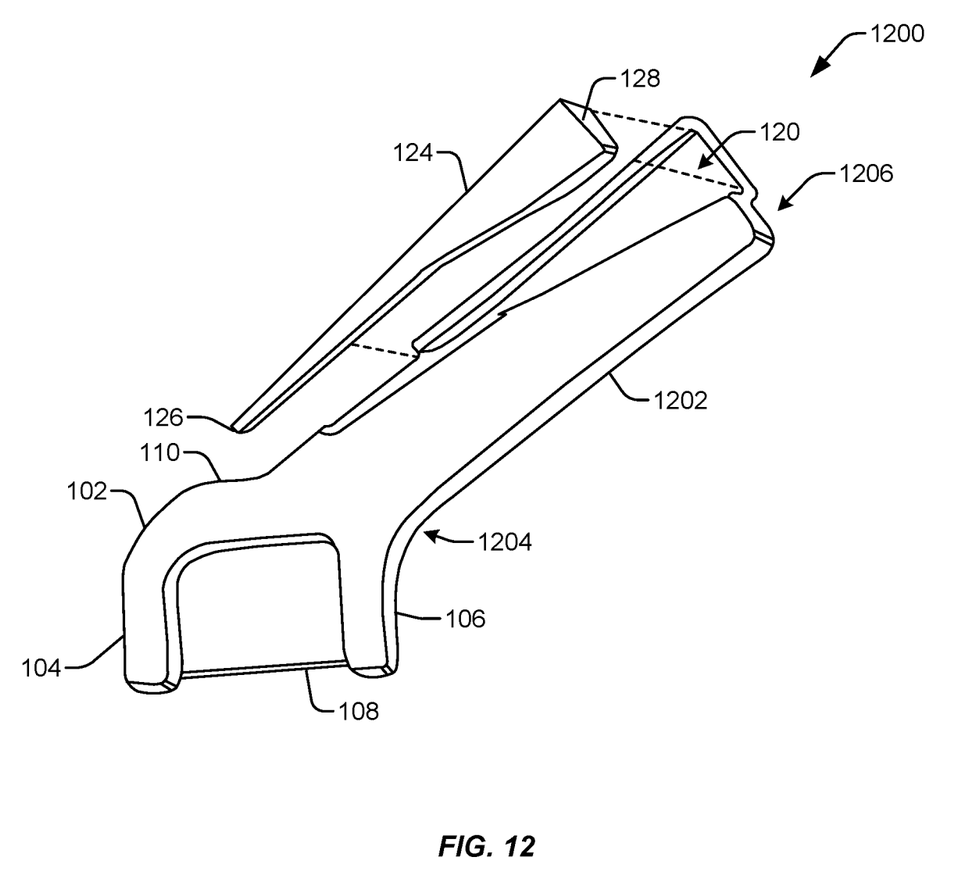
FIG. 12 is a perspective view of an embodiment of a hybrid dental tool with a handle including a pick receptacle.

With reference now to FIG. 12, a perspective view of an embodiment of a hybrid dental tool 1200 is shown. This hybrid dental tool 1200 includes the flossing head 102 having the first arm 104 and the second arm 106 connected by the first filament 108 and the link arm 110.

Extending from the flossing head is handle 1202. The handle 1202 can be sized and shaped so as to allow a user to hold the handle 1202 to control operation of the hybrid dental device 1200. In some embodiments, the handle 1202 can be made of the same material as the flossing head 102, and in some embodiments, the handle 1202 can be made of a different material than the flossing head 102. The handle 1202 can include a connecting end 1204 that connects to the flossing head 102, and specifically can connect to one or more of the link arm 110 and the second arm 106. The handle 1202 can further include a free end 1206. In some embodiments, the free end 1206 is located opposite the connecting end 1204, and does not directly connect to the flossing head 102, but rather connects to the flossing head 102 via the connecting end 1204.

The handle 1202 can include the pick receptacle 120. In the embodiment depicted in FIG. 12, the pick receptacle 120 extends from the free end 1206 of the handle 1202 towards the connecting end 1204 of the handle. The pick receptacle 120 can be shaped such that the first end 126 of the pick 124 is relatively more proximate to the connecting end 1204 of the handle 1202, and the second end 128 of the pick 124 is relatively more proximate to the free end 1206 of the handle 1202. In some embodiments, the pick receptacle 120 can be sized to be smaller than the pick 124 and/or so that one or several dimensions of the pick receptacle 120 are smaller than the corresponding one or several dimensions of the pick 124 to thereby create a friction fit and/or interference fit. In some embodiments, this interference fit can result in deformations to some or all of the pick receptacle 120 and/or the pick 124, which deformations can retain the pick 124 within the pick receptacle 120.

Figure 13:
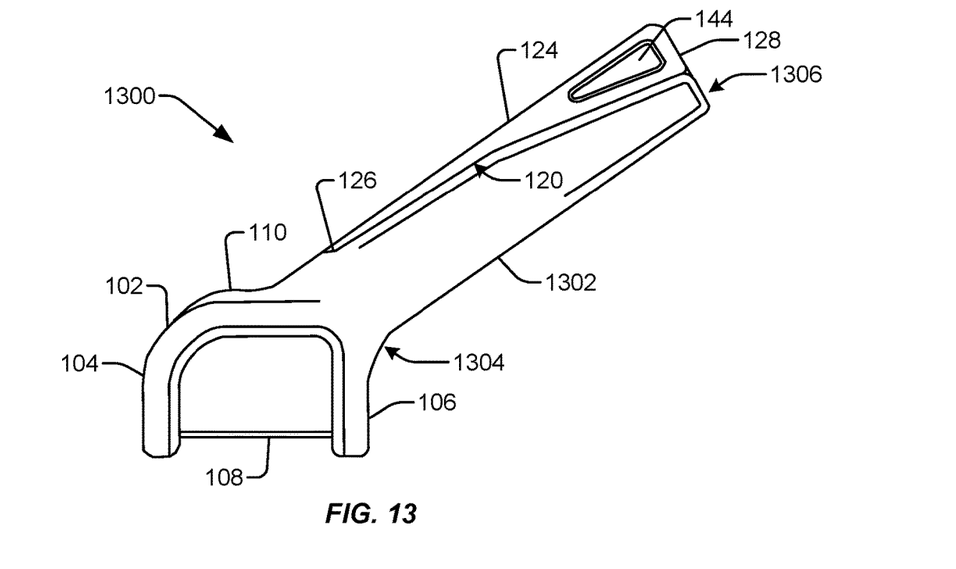
FIG. 13 is a front view of an embodiment of a hybrid dental tool with a handle including a pick receptacle.

With reference now to FIG. 13, a front view of an embodiment of a hybrid dental tool 1300 is shown. This hybrid dental tool 1300 includes the flossing head 102 having the first arm 104 and the second arm 106 connected by the first filament 108 and the link arm 110.

Extending from the flossing head is handle 1302. The handle 1302 can be sized and shaped so as to allow a user to hold the handle 1302 to control operation of the hybrid dental device 1300. In some embodiments, the handle 1302 can be made of the same material as the flossing head 102, and in some embodiments, the handle 1302 can be made of a different material than the flossing head 102. The handle 1302 can include a connecting end 1304 that connects to the flossing head 102, and specifically can connect to one or more of the link arm 110 and the second arm 106. The handle 1302 can further include a free end 1306. In some embodiments, the free end 1306 is located opposite the connecting end 1304, and does not directly connect to the flossing head 102, but rather connects to the flossing head 102 via the connecting end 1304.

The handle 1302 can include the pick receptacle 120 and the connecting features 144. In the embodiment depicted in FIG. 13, the pick receptacle 120 extends from the free end 1306 of the handle 1302 towards the connecting end 1304 of the handle. The pick receptacle 120 can be shaped such that the first end 126 of the pick 124 is relatively more proximate to the connecting end 1304 of the handle 1302, and the second end 128 of the pick 124 is relatively more proximate to the free end 1306 of the handle 1302.

Figure 14:
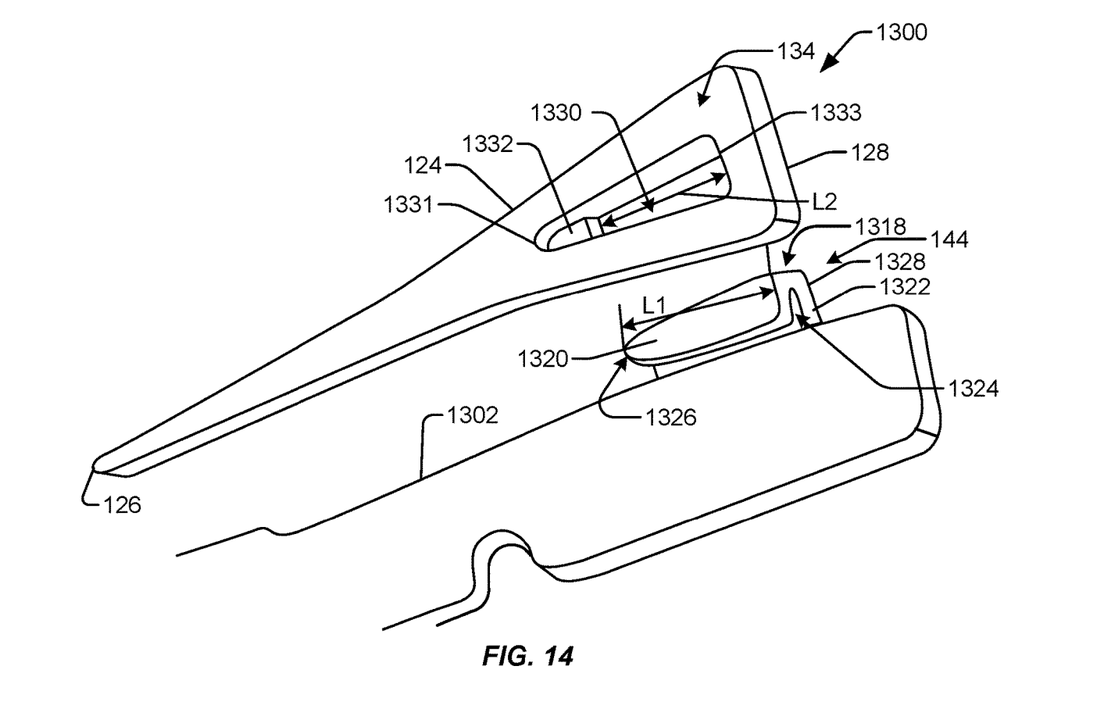
FIG. 14 is a close-up perspective view of the connecting features of the hybrid dental tool of FIG. 13.

With reference now to FIG. 14, a close-up perspective view of the connecting features 144 and the mating features 134 is shown. The connecting features 144 include a male insert 1318 having a front portion 1320 and a back portion 1322 that are partially separated by a void 1324. The male insert 1318 further includes a first end 1326 and an opposing second end 1328. The first end 1326 and the second end 1328 are separated by a distance L1.

The mating features 134 include a female receptacle 1330 that is sized and shaped to receive the male insert 1318. The female receptacle 1330 has a first end 1331 and a second end 1333. A retention tab 1332 is located at the first end 1331 of the female receptacle 1330. The retention tab 1332 is sized and shaped to be, at least partially, received within the void 1324 of the connecting features 144. As depicted in FIG. 14, the distance between the retention tab 1332 and the second end 1333 of the female receptacle 1330 is defined by a distance L2. In some embodiments, distance L2 can be greater than and/or equal to distance L1 to thereby allow the male insert 1318 to be received within the female receptacle 1330. In such an embodiment, after the male insert 1318 has been received in the female receptacle 1330, the male insert 1318, and the thereto connected pick 124, can be slid relatively towards the retention tab 1332 and/or the first end 1331 of the female receptacle 1330. This motion of the male insert 1318 with respect to the female receptacle 1330 can result in the retention tab 1332 being at least partially received within the void 1324 such that the front portion 1320 is on one side of the retention tab 1332 and the back portion 1322 is on the other, opposite side of the retention tab 1332. This positioning secures the male insert 1318, and thereby the pick 124, with respect to the flosser 101.

Figure 15:
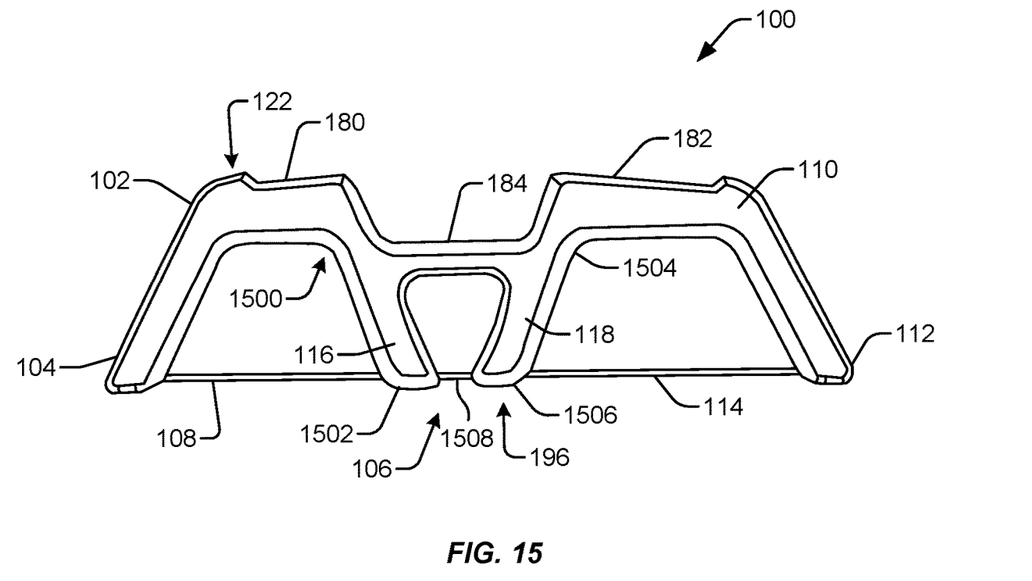
FIG. 15 is a front view of one embodiment of the hybrid dental tool having a single filament.

With reference now to FIG. 15, a front view of one embodiment of the hybrid dental tool 100 is shown. As seen in FIG. 15, the hybrid dental tool 100 includes the flossing head 102 having the first arm 104, the second arm 106 including the first portion 116 and the second portion 118, and the third arm 112. As depicted in FIG. 15, the first portion 116 includes a proximal end 1500 connecting to the link arm 110, and a distal end 1502. Similarly, the second portion includes a proximal end 1504 connecting to the link arm 110, and a distal end 1506.

In some embodiments, the distance between the first arm 104 and the first portion 116 of the second arm 106 can be the same as the distance between the second portion 118 of the second arm 106 and the third arm 112. In some embodiments, the distance between the first arm 104 and the first portion 116 of the second arm 106 can be the different than the distance between the second portion 118 of the second arm 106 and the third arm 112. In some embodiments, different distances between the first arm 104 and the first portion 116 of the second arm 106 and between the second portion 118 of the second arm 106 and the third arm 112 can allow a user to better use the hybrid dental tool 100 to clean between teeth located in both the front of the user's mouth and in the back of the user's mouth.

In some embodiments, the first and second portions 116, 118 of the second arm 106 can be connected to each other along the entirety of their length as shown in FIG. 1, and in some embodiments, the first and second portions 116, 118 can only connect to the link arm 110, and thus to each other at their proximal ends 1500, 1504.

As further seen in FIG. 15, a single filament 196 extends from the first arm 104 to the third arm 112. This single filament 196 forms the first filament 108 and the second filament 114, and also forms a third filament 1508 extending from the first portion 116 to the second portion 118. In some embodiments, for example, the hybrid dental device shown in FIG. 15 can be created by tensioning the single filament 196 across a mold (not shown), closing the mold, and molding the flossing head 102 in the mold and around portion of the first filament 196. After the material of the flossing head 102 has solidified, the mold can be opened and the flossing head 102 and the connected single filament 196 can be removed from the mold.

Figure 16:
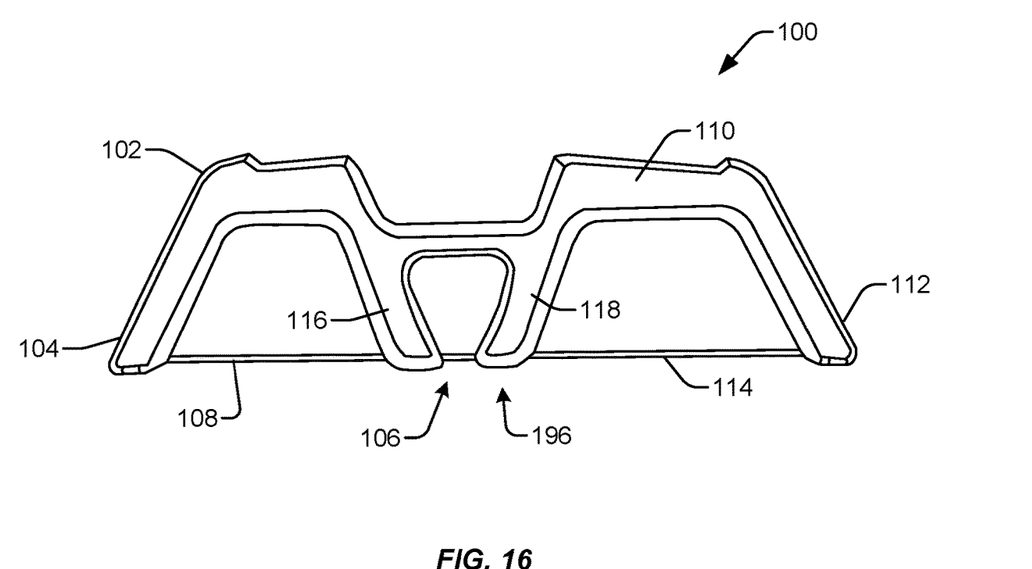
FIG. 16 is a front view of one embodiment of the hybrid dental tool having a severed single filament.

In some embodiments, the single filament 196 can be severed such that the first and second filaments 108, 114 are independent of each other. In some embodiments, this severing can facilitate maintenance of higher tensioning in one or both of the first and second filaments 108, 114, and can specifically prevent the loss of tension in one of the first and second filaments 108, 114 from affecting the tension in the other of the first and second filaments 108, 114. In some embodiments, the single filament 196 can be severed by a cutting implement that can be, for example, a heated cutting implement including, for example, hot air, a flame, a wire cutter, a heated piece of metal, or the like. In some embodiments, the cutting implement can sever the single filament 196, and in some embodiments, the cutting implement can likewise sever portions of the second arm 106 such that the first and second portions 116, 118 are only connected via their proximal ends 1500, 1504. One embodiment of the hybrid dental device 100 having the severed single filament 196 is shown in FIG. 16.

While various embodiments of present invention have been described, it will be apparent to those of skill in the art that many more embodiments and implementations are possible that are within the scope of this invention. Accordingly, the present invention is not to be limited to the described embodiments.

What is claimed is:
1. A dental device comprising:
a first arm extending in a first direction from a link arm;

a second arm comprising first and second portions separated by an empty space, each of the first and second portions extending in the first direction from the link arm;

a third arm extending in the first direction from the link arm;

a first filament extending from a first point of extension on the first arm to a second point of extension on the first portion of the second arm, and wherein the first filament is directly molded to the first portion of the second arm; and a second filament extending from a third point of extension on the second portion of the second arm to a fourth point of extension on the third arm, and wherein the second filament is directly molded to the second portion of the second arm.

2. The dental device of claim 1, wherein the first and second portions of the second arm are positioned such that a first distance between the first portion of the second arm and the second portion of the second arm is less than a second distance between the first portion of the second arm and the first arm, and is less than a third distance between the second portion of the second arm and the third arm.

3. The dental device of claim 2, wherein the first and second portions of the second arm are connected by a central portion of the link arm, wherein the central portion of the link arm is between first and second peripheral portions of the link arm, wherein the first point of extension on the first arm and the fourth point of extension on the third arm define a line, and wherein the first and second portions of the second arm are positioned such that a fourth shortest distance between the central portion of the link arm and the line, is less than a fifth shortest distance between the second peripheral portion and the line, and is less than a sixth shortest distance between the first peripheral portion and the line.

4. The dental device of claim 2, wherein the first and second portions of the second arm are positioned such that the first and second filaments have different lengths.

5. The dental device of claim 2, wherein the first filament is molded to the first portion of the second arm and the second filament is molded to the second portion of the second arm such that a first tension in the first filament is independent of a second tension in the second filament.

6. The dental device of claim 1, wherein the first and second portions of the second arm are connected by a central portion of the link arm, wherein the central portion of the link arm is between first and second peripheral portions of the link arm, wherein the first point of extension on the first arm and the fourth point of extension on the third arm define a line, and wherein the first and second portions of the second arm are positioned such that a fourth shortest distance between the central portion of the link arm and the line, is less than a fifth shortest distance between the second peripheral portion and the line, and is less than a sixth shortest distance between the first peripheral portion and the line.

7. The dental device of claim 6, wherein the first and second portions of the second arm are positioned such that the first and second filaments have different lengths.

8. The dental device of claim 6, wherein the first filament is molded to the first portion of the second arm and the second filament is molded to the second portion of the second arm such that a first tension in the first filament is independent of a second tension in the second filament.

9. The dental device of claim 1, wherein the first and second portions of the second arm are positioned such that the first and second filaments have different lengths.

10. The dental device of claim 9, wherein the first filament is molded to the first portion of the second arm and the second filament is molded to the second portion of the second arm such that a first tension in the first filament is independent of a second tension in the second filament.

11. A method of manufacturing a dental device comprising:

forming a flossing head around a single filament, wherein the flossing head comprises:

a first arm extending in a first direction from a link arm;

a second arm comprising first and second portions separated by an empty space, each of the first and second portions extending in the first direction from the link arm;

a third arm extending in the first direction from the link arm;

a first filament extending from a first point of extension on the first arm to a second point of extension on the first portion of the second arm, wherein the first and second points of extension define a first line, and wherein the first filament is directly molded to the first portion of the second arm; and a second filament extending from a third point of extension on the second portion of the second arm to a fourth point of extension on the third arm, wherein the third and fourth points of extension define a second line, and wherein the second filament is directly molded to the second portion of the second arm.

12. The method of claim 11, wherein the first and second portions of the second arm are positioned such that a first distance between the first portion of the second arm and the second portion of the second arm is less than a second distance between the first portion of the second arm and the first arm, and is less than a third distance between the second portion of the second arm and the third arm.

13. The method of claim 12, wherein the first and second portions of the second arm are connected by a central portion of the link arm, wherein the central portion of the link arm is between first and second peripheral portions of the link arm, wherein the first point of extension on the first arm and the fourth point of extension on the third arm define a line, and wherein the first and second portions of the second arm are positioned such that a fourth shortest distance between the central portion of the link arm and the line, is less than a fifth shortest distance between the second peripheral portion and the line, and is less than a sixth shortest distance between the first peripheral portion and the line.

14. The method of claim 12, wherein the first and second portions of the second arm are positioned such that the first and second filaments have different lengths.

15. The method of claim 12, wherein the first filament is molded to the first portion of the second arm and the second filament is molded to the second portion of the second arm such that a first tension in the first filament is independent of a second tension in the second filament.

16. The method of claim 11, wherein the first and second portions of the second arm are connected by a central portion of the link arm, wherein the central portion of the link arm is between first and second peripheral portions of the link arm, wherein the first point of extension on the first arm and the fourth point of extension on the third arm define a line, and wherein the first and second portions of the second arm are positioned such that a fourth shortest distance between the central portion of the link arm and the line, is less than a fifth shortest distance between the second peripheral portion and the line, and is less than a sixth shortest distance between the first peripheral portion and the line.

17. The method of claim 16, wherein the first and second portions of the second arm are positioned such that the first and second filaments have different lengths.

18. The method of claim 16, wherein the first filament is molded to the first portion of the second arm and the second filament is molded to the second portion of the second arm such that a first tension in the first filament is independent of a second tension in the second filament.

19. The method of claim 11, wherein the first and second portions of the second arm are positioned such that the first and second filaments have different lengths.

20. The method of claim 19, wherein the first filament is molded to the first portion of the second arm and the second filament is molded to the second portion of the second arm such that a first tension in the first filament is independent of a second tension in the second filament.

* * * * *